Aug. 23, 1960
P. D. GROVER ET AL
2,950,373
DEVICE FOR RENDERING ELECTRIC SWITCHES ENVIRONMENT-RESISTANT
Filed Dec. 2, 1958
2 Sheets-Sheet 1
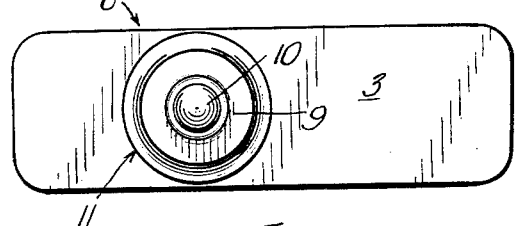
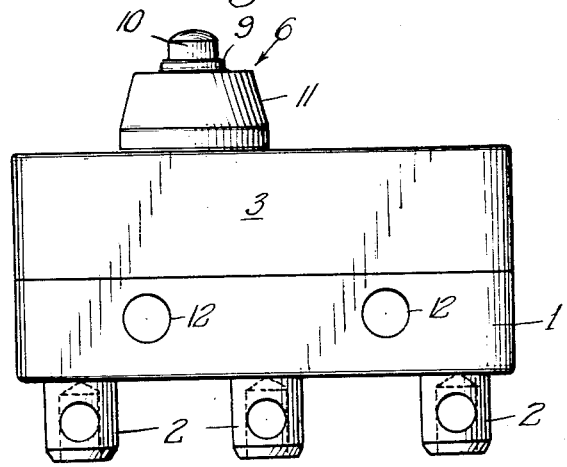
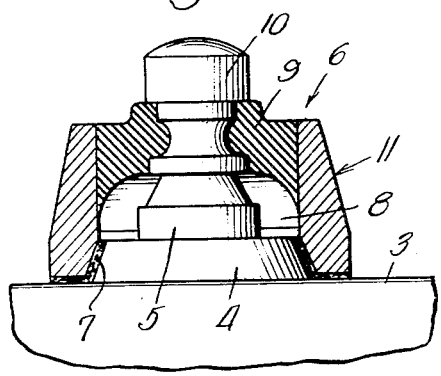
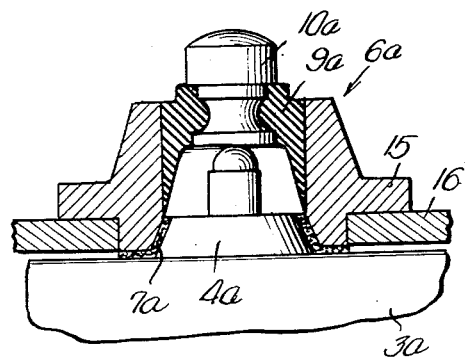
INVENTORS.
Philip D. Grover,
BY Melvin G. Kraft,
George H. Simmons

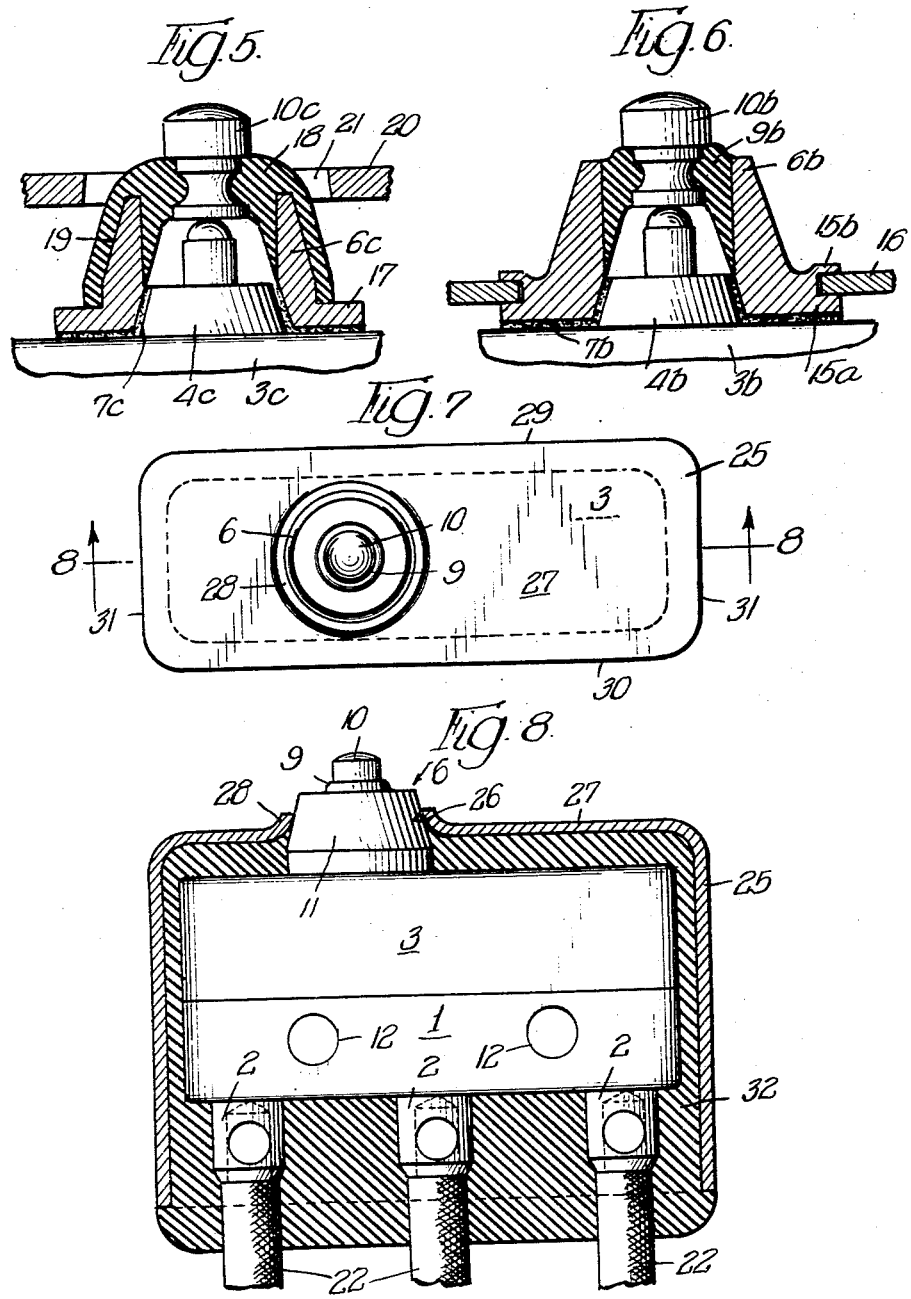

United States Patent Office 2,950,373
Patented Aug. 23, 1960

2,950,373

DEVICE FOR RENDERING ELECTRIC SWITCHES ENVIRONMENT-RESISTANT

Philip D. Grover, Chicago, and Melvin G. Kraft, Bellwood, Ill., assignors, by mesne assignments, to Controls Company of America, Schiller Park, Ill., a corporation of Delaware Filed Dec. 2, 1958, Ser. No. 777,763

11 Claims. (Cl. 200—168)

This invention relates to a device for rendering an electric switch environment-resistant, and has for its principal object the provision of a new and improved device of this kind.

It is a main object of the invention to provide a device which when fixed on the casing of an electric switch renders that switch environment-resistant by preventing the entrance of extraneous matter into that casing.

Another object of the invention is to provide a device for rendering an electric switch environment-resistant, which can be incorporated in a hermetic seal for the switch.

Another object of the invention is to provide a device for rendering an electric switch environment-resistant, which device may also serve to facilitate mounting the switch upon a panel or escutcheon.

Another object of the invention is to provide a device for rendering an electric switch environment-resistant, which can be manufactured at low cost without sacrificing quality.

Further objects of the invention, not specifically mentioned here, will be apparent from the detailed description and claims which follow, reference being had to the accompanying drawings in which a preferred embodiment of the invention is shown by way of example and in which:

Fig. 1 is a plan view of a switch, drawn to an enlarged scale and showing the device of the present invention attached thereto;

Fig. 2 is a side elevational view of the switch shown in Fig. 1;

Fig. 3 is a fragmentary view, partly in section and drawn to a further enlarged scale to show the details of the device of the present invention;

Fig. 4 is a view similar to Fig. 3, drawn to a slightly reduced scale and showing a modified form of the device;

Fig. 5 is a view similar to Fig. 4, showing another form of device;

Fig. 6 is a view similar to Fig. 4, showing still another form of device;

Fig. 7 is a plan view of a hermetically sealed switch, drawn to an enlarged scale and incorporating the device shown in Figs. 1, 2, and 3; and Fig. 8 is a cross-sectional view taken along the line 8—8 of Fig. 7, looking in the direction of the arrows and showing the switch and device of this invention in elevation.

Electric switches are frequently used under conditions which make necessary protecting the switch from entrance of extraneous matter into the working parts of the switch. The procedure of so protecting switches is usually referred to as rendering the switch environment-resistant. In many instances, where the extraneous matter to be excluded from the working parts of the switch consists of air-borne particles such as dust, hermetic sealing of the switch is not necessary. In other instances, where the environment in which the switch is used involves changes in atmospheric pressure, temperature and humidity such as are frequently encountered in aircraft, hermetic sealing of the switch is required. Hermetic sealing is also required of switches used under gaseous conditions where a spark might cause an explosion.

Electric switches of the type to which this invention refers, are quite small and have working parts encased in a casing that is composed of an insulating material. Frequently such casings consist of a base part upon which the working parts of the switch are mounted and through which terminals are led to extend electric circuits into and out of the switch mechanism. A cover containing cavities for receiving the working parts of the switch is attached to the base and contains a perforation through which an operating button for the switch projects.

In rendering a switch of this type environment-resistant, guarding against entry of extraneous matter into the cavities of the casing in the region of the operating button is all that is necessary, since the terminals leading out of the base portion of the casing are molded into that portion and hence sealed therein. The cover portion of the casing can be made sufficiently tight by cementing it to the base portion, thus rendering the switch environment-resistant except for the region immediately surrounding the operating button.

In accordance with the present invention, completely rendering the switch environment-resistant is accomplished by applying to the switch casing a bushing that contains a diaphragm which carries a plunger that engages the operating button of the switch. The bushing is sealed to the switch casing and the diaphragm sealed to the bushing and operating button, thereby completely sealing off the operating button from entrance of extraneous matter therearound. The diaphragm being flexible permits operation of the switch in the usual manner.

The invention will be best understood by reference to the accompanying drawings where from Figs. 1 to 3, inclusive, it will be seen that the switch of the type to which the present invention relates consists of a casing having a base portion 1, from one face of which terminals 2 are projected. The switch mechanism, not shown, is mounted upon this base. The switch shown by way of example is a single pole double throw switch of the snap action type, and the three terminals are connected, one to the movable blade of the switch, a second to the contact engaged by that blade when the switch is in normal position, and the other to the contact engaged by the blade when the switch is in operated position.

The switch also contains a cover portion 3 containing a cavity in which the switch mechanism is positioned. As will be seen in Fig. 3, a collar 4 rises out of the upper surface of the cover 3 and the operating button 5 of the switch projects through this collar and therebeyond.

The bases 1 and covers 3 of switches of the type are usually molded either from a thermosetting resin or a thermoplastic resin. A tight joint between the base and cover of such a switch is easily achieved by cementing.

The environment-resistant device of the present invention consists of a bushing, indicated generally at 6, that is shaped to snugly engage the collar 4 of the switch casing, to which collar and casing the bushing is fixed and sealed by cement 7, preferably an epoxy resin. It will be noted that the bushing 6 contains a cylindrical inner wall 8 to which an elastomer diaphragm 9 is fixed in seal-forming engagement. Fixed to and carried by the diaphragm 9 is a plunger 10 to which the diaphragm is sealed, the plunger 10 engaging the operating button 5 of the switch. As shown at 11, the outer surface of the bushing 6 is frusto-conical in shape, with the base portion adjacent the cover 3 of the switch casing.

Preferably the collar 6 and the plunger 10 are composed of metal and the diaphragm 9 composed of an elastomer capable of being chemically bonded to the bushing and plunger. The particular kind of elastomer in the diaphragm will depend upon the use to which the switch is to be put. The use of Buna N, Neoprene, or Silicone rubber elastomers is contemplated. Through this arrangement the space between the outer surface of the operating button 5 and the inner surface of the collar 4 is sealed by the bushing, the diaphragm, and the plunger, and with the cover 3 cemented onto the base portion 1 of the casing entrance of extraneous matter into the cavity in which the operating parts of the switch are located is definitely prevented.

It will be noted that in Fig. 2 the base portion 1 contains perforations 12 by which the switch may be mounted. These perforations extend completely through the base portion but do not communicate with the cavity in the casing and hence entrance of extraneous matter into this cavity through the perforations 12 is impossible.

Switches of the type to which the present invention refers must usually be small and of light weight to meet the conditions imposed upon them. The environment-resistant device of the present invention is sufficiently compact to enable it to be fixed upon the switch casing without increasing the overall dimensions thereof beyond allowable limits. The bushing may be composed of a light material such as aluminum to keep the switch within weight limitations.

The particular type of bushing by which the switch is rendered environment-resistant may be varied within the teachings of the invention. In Fig. 4, there is shown one such variation in which the bushing 6a contains a radially outwardly extending flange 15 adapted to seat against a mounting plate or escutcheon 16 to position the bushing with respect thereto. After the bushing is thus located, the collar 4a of cover 3a of the switch casing, with cement 7a applied thereto, is registered with the bushing and secured thereto by the cement. The diaphragm 9a and the button 10a are constructed and function in the same manner as do the diaphragm and button of Fig. 3.

In Fig. 6 there is shown another embodiment in which the bushing 6b contains an outwardly extending flange 15a which is stepped and adapted to be peened over a mounting plate 16, as shown at 15b, to fix the bushing in the plate. The bushing may be secured to the casing 3b and collar 4b by cement 7b prior to registration of the bushing with the panel 16 and then secured thereto in the manner indicated at 15b. If desired, however, the bushing can be secured in the panel prior to securing the switch casing thereto. Diaphragm 9b and plunger 10b are constructed and function in the same manner as before.

Still another embodiment of the invention is shown in Fig. 5, wherein the bushing 6c contains an outwardly extending flange 17 that engages the cover 3c of the switch casing. The elastomer diaphragm 18 engages both the inner and outer surfaces of the bushing 6c and is bonded thereto. The outer surface of the bushing and elastomer are tapered, as indicated at 19. The bushing, diaphragm and plunger 10c are fixed upon the collar 4c by cement 7c as before. In order to mount the switch upon a panel or escutcheon 20, the bushing is projected through and forced into the perforation 21 in the panel and the elastomer on the outer surface of the bushing distorted thereby to securely mount the switch upon the panel.

In Figs. 7 and 8, there is shown a hermetic seal for the switch of the type shown in Figs. 1 to 3, inclusive. Prior to sealing the switch a wire 22 is secured to each of the terminals 2, and bushing 6, diaphragm 9, and plunger 10 registered with the cover 3 of the switch casing as before. The assembly thus formed is placed within a housing 25 which contains a perforation 26 in its upper surface 27. Bushing 6 is registered with and forced through this perforation, the tapered outer surface 11 of the bushing distorting the wall 27 outwardly, as indicated at 28. The housing 25 contains side walls 29 and 30, Fig. 7, which contain perforations with which the mounting holes 12 in the base portion 1 of the switch casing are registered and secured by means not shown. It will be noted from Fig. 7 that with the bushing 6 so registered with the perforation in the top wall 27, the switch casing is centered in the housing 25 and there is a space between the outer surface of the switch casing and inner surface of the housing wall.

It will also be noted that the end walls 31 of the housing are spaced away from the end walls of the switch casing and that the top wall of the switch casing is spaced from the top wall 27 of the housing. The space thus formed is completely filled with a sealing compound 32 which preferably is an epoxy resin specifically Bis-phenol-A resin. While this epoxy resin has proven itself to be satisfactory for this purpose, other epoxy resins or other materials may also be used, and such use is contemplated.

The preferred epoxy resin is advantageous in that it can be poured into the housing at room temperature. At this temperature it is sufficiently fluid to completely fill the space between the switch casing and housing, but is not sufficiently fluid to penetrate into the switch casing even though the base and cover thereof are not cemented together. This resin can be cured at low temperature without an application of pressure, and consequently the switch casing is not damaged even though it be composed of a thermoplastic material. After curing, the resin adheres to the switch casing and to the walls of the housing 25 and to the wires 22, thereby to form with the device of the present invention a complete hermetic seal for the switch.

The housing 25 is composed of metal, aluminum in the preferred embodiment; and since the housing is compact, the overall dimensions and weight of the hermetically sealed switch are maintained within allowable limits.

The device of the present invention makes possible rendering a switch environment-resistant even where hermetic sealing is required. The device is of simple construction and may be manufactured at low cost and installed upon the switch casing without difficulty. The particular type of elastomer used in the diaphragm of the device may be varied within the teachings of the invention, choice of the type of elastomer to be used being governed by conditions expected to be encountered by the switch in the use to which it is to be put.

While we have chosen to illustrate our invention by showing and describing a preferred embodiment of it, we have done so by way of example only, as there are many modifications and adaptations which can be made by one skilled in the art within the teachings of the invention.

Having thus complied with the statutes and shown and described a preferred embodiment of our invention, what we consider new and desire to have protected by Letters Patent is pointed out in the appended claims.

What we claim is:

1. A device for rendering environment-resistant, a switch having a casing from which an operating button projects through an outwardly projecting collar, comprising: a metallic bushing fixed to the casing and collar and encircling said button; a flexible diaphragm fixed in said bushing; and a plunger fixed in said diaphragm, extending outwardly therefrom and extending inwardly therefrom and into engagement with said button.

2. A device as specified in claim 1, in which the bushing is hollow and contains an inner cylindrical portion to which the diaphragm is fixed.

3. A device as specified in claim 2, in which the outer surface of the bushing is frusto-conical in shape and tapers towards a point remote from the switch base.

4. A device as specified in claim 1, in which the diaphragm is composed of an elastomer that is fixed to the metallic bushing by chemical bonding.

5. A device as specified in claim 4, in which the plunger is composed of metal and in which the diaphragm is fixed to the plunger by chemical bonding.

6. A device as specified in claim 1, in which the bushing contains a radially outwardly extending flange adapted to engage a mounting plate to position the bushing and switch with respect thereto.

7. A device as specified in claim 1, in which the diaphragm and plunger extend beyond the end of the metallic bushing that is remote from the switch casing.

8. A device as specified in claim 3, in which the elastomer extends across the end of the metallic bushing remote from the switch casing and over the outside of the bushing and is fixed thereto by chemical bonding.

9. A device for sealing an electric switch that is encased in a casing from which an operating button projects through a collar and from which electrical terminals project and to which terminals wires are connected, comprising: a metallic bushing fixed upon said collar and projecting outwardly therefrom beyond the end of said button; a flexible diaphragm fixed in said bushing in hermetic seal-forming engagement therewith; a plunger hermetically sealed in said diaphragm and engaging said button for operating the same; a housing containing a perforation, said switch casing being positioned in said housing with said metallic bushing projecting through said perforation, there being a space between said casing and housing; and a sealing material completely filling said space and sealingly engaging said housing, said metallic bushing, said switch casing, said terminals and portions of the wires attached thereto, to form a hermetic seal for the switch.

10. A sealing device as specified in claim 9, in which the switch casing has a top face from which the collar projects and side walls which contain mounting perforations, and the housing has a top wall through the perforation in which the metallic bushing projects and has side walls having mounting perforations with which the switch casing perforations are aligned.

11. A sealing device as specified in claim 10, in which the space between the switch casing and the housing extends completely around the switch casing and in which the metallic bushing extends across that space into tight contact with the housing.

References Cited in the file of this patent

UNITED STATES PATENTS

| | | |
|---|---|---|
| 2,462,023 | Johnson et al. | Feb. 15, 1949 |
| 2,706,742 | Ehlers | Apr. 19, 1955 |
| 2,795,144 | Morse | June 11, 1957 |
| 2,814,703 | Martin | Nov. 26, 1957 |
| 2,814,704 | Bald | Nov. 26, 1957 |
| 2,854,536 | Beer | Sept. 30, 1958 |

FOREIGN PATENTS

| | | |
|---|---|---|
| 329,447 | Great Britain | May 22, 1930 |
| 620,961 | Great Britain | Apr. 1, 1949 |